US005360213A

United States Patent [19]

Crowley et al.

[11] Patent Number: 5,360,213

[45] Date of Patent: Nov. 1, 1994

[54] APPARATUS FOR SEPARATING FOLDED WEB

[75] Inventors: H. W. Crowley, Newton; Joseph R. Bilinski, Tewksbury, both of Mass.

[73] Assignee: Roll Systems, Inc., Burlington, Mass.

[21] Appl. No.: 943,446

[22] Filed: Sep. 10, 1992

Related U.S. Application Data

[63] Continuation of Ser. No. 641,472, Jan. 15, 1991, Pat. No. 5,149,075, and a continuation-in-part of Ser. No. 912,822, Jul. 13, 1992, which is a continuation of Ser. No. 761,692, Sep. 18, 1991, Pat. No. 5,131,640, which is a continuation of Ser. No. 534,724, Jun. 7, 1990, Pat. No. 5,065,992.

[51] Int. Cl.[5] .......................... B41L 1/32; B23B 3/04; B31B 1/00

[52] U.S. Cl. .......................................... 270/39; 83/61; 83/522.12; 493/11; 493/22; 493/23; 493/357; 493/411; 493/12

[58] Field of Search .................... 270/39, 52.5; 493/11, 493/12, 22, 23, 357, 410, 411, 412, 414, 415; 83/58, 61, 63, 522.12

[56] References Cited

U.S. PATENT DOCUMENTS

| | | | |
|---|---|---|---|
| 992,473 | 5/1911 | Barber . | |
| 1,024,459 | 4/1912 | Seymour . | |
| 2,214,593 | 9/1940 | Mustin et al. . | |
| 2,675,747 | 4/1954 | Greiner et al. . | |
| 2,936,815 | 5/1960 | Schjeldahl et al. . | |
| 3,048,389 | 8/1962 | Salmon et al. . | |
| 3,301,111 | 1/1967 | Nystrand . | |
| 3,589,709 | 6/1971 | Hey et al. . | |
| 3,627,304 | 12/1971 | Reeder et al. . | |
| 3,640,521 | 2/1972 | Hutley . | |
| 3,684,275 | 8/1972 | Schweitzer et al. | 270/79 |
| 3,724,838 | 4/1973 | Orlovsky . | |
| 3,744,362 | 7/1973 | Gesell et al. | 83/522.12 X |
| 3,746,142 | 7/1973 | Hepp et al. . | |
| 3,820,700 | 6/1974 | Quirijnen . | |
| 3,858,476 | 1/1975 | DeLigt . | |
| 3,889,940 | 6/1975 | Jakob | 495/415 |
| 3,897,051 | 7/1975 | Muller . | |
| 3,913,904 | 10/1975 | Occhetti | 270/39 X |
| 3,961,781 | 6/1976 | Funk | 493/23 X |
| 3,991,993 | 11/1976 | Clouthier . | |
| 4,045,012 | 8/1977 | Jakob | 495/415 |
| 4,068,566 | 1/1978 | Joice . | |
| 4,118,022 | 10/1978 | Rayfield et al. . | |
| 4,134,559 | 1/1979 | Dyllus et al. | 242/78.1 |
| 4,190,242 | 2/1980 | Bolza-Schunemann . | |
| 4,205,836 | 6/1980 | Nystrand . | |
| 4,216,705 | 8/1980 | Achelpohl et al. . | |
| 4,223,882 | 9/1980 | Stocker . | |

(List continued on next page.)

FOREIGN PATENT DOCUMENTS

| | | |
|---|---|---|
| 2506901 | 8/1975 | Germany . |
| 60-102367 | 6/1985 | Japan . |
| 60-171969 | 9/1985 | Japan . |
| 988080 | 4/1965 | United Kingdom . |
| WO88/03121 | 5/1988 | WIPO . |
| WO88/03509 | 5/1988 | WIPO . |

*Primary Examiner*—Edward K. Look
*Assistant Examiner*—John Ryznic
*Attorney, Agent, or Firm*—Wolf, Greenfield & Sacks

[57] ABSTRACT

A web separator is provided that cuts a web at predetermined separation locations. Downstream of the cutting, the web is folded at predetermined fold locations. A continuously swinging director, downstream of the folding, guides advancing sections of web to opposing fold edges of a supported zig-zag stack. The web is driven into the continuously swinging director by a driving member. The driving member is deactivated selectively by a clutch, while other elements of the separator continue to operate. A central drive motor may be interconnected with each of the drive member, swinging director, folding and support elements. Fold and separation locations may be determined by a bar code detector and selectively operable upper and lower conveyor belts may be disposed below the supported zig-zag stack.

40 Claims, 4 Drawing Sheets

U.S. PATENT DOCUMENTS 5,065,992 11/1991 Crowley .......... 270/39
5,087,023 2/1992 Gilbert et al. .......... 270/39
5,131,640 7/1992 Crowley .......... 270/39
4,261,497 4/1981 Roetter et al. .
4,269,401 5/1981 Sargis et al. .
4,296,684 10/1981 Wangermann .
4,401,428 8/1983 Thomas et al. .......... 493/415
4,406,650 9/1983 Felix .......... 493/410
4,412,637 11/1983 Berger .
4,460,350 7/1984 Mittal et al. .
4,487,645 12/1984 Weston .
4,507,109 3/1985 Meschi .
4,508,527 4/1985 Uno et al. .
4,573,409 3/1986 Clar et al. .
4,573,670 3/1986 Felix .
4,577,789 3/1986 Hofmann et al. .
4,578,052 3/1986 Engel et al. .......... 493/11
4,593,893 6/1986 Suter .
4,610,649 9/1986 Friess .
4,611,799 9/1986 Nuttin .......... 270/52.5
4,618,340 12/1986 Meschi .
4,623,136 11/1986 Bunch, Jr. .......... 270/39 X
4,650,447 3/1987 Meschi .
4,673,382 6/1987 Buck et al. .......... 493/359
4,688,708 8/1987 Irvine et al. .
4,702,135 10/1987 Kwasnitza .
4,708,332 11/1987 Besemann .
4,718,654 1/1988 Ehlers .
4,721,295 1/1988 Hathaway .
4,725,051 2/1988 Parr .
4,729,812 3/1988 Meschi .
4,730,762 3/1988 Felix .......... 270/39 X
4,751,879 6/1988 Van Pelt .
4,781,090 11/1988 Feldkamper et al. .......... 83/74
4,824,426 4/1989 DuFresne .
4,828,540 5/1989 Fordyce .......... 493/414
4,842,572 6/1989 Roth .
4,846,454 7/1989 Parkander .......... 270/39 X
4,861,327 8/1989 Hanyu et al. .......... 493/415
4,871,157 10/1989 Hermann et al. .......... 270/39
4,917,657 4/1990 Bunch, Jr. .......... 493/414 X
4,928,940 5/1990 Dash .......... 270/39 X
5,030,192 7/1991 Sager .......... 493/411 X
5,049,121 9/1991 Bunch, III .......... 493/357

APPARATUS FOR SEPARATING FOLDED WEB

RELATED APPLICATION

This application is a continuation of application Ser. No. 07/641,472, filed on Jan. 15, 1991, now U.S. Pat. No. 5,149,075, issued Sep. 22, 1992. This application is also a continuation-in-part of co-pending application Ser. No. 07/912,822, filed Jul. 13, 1992 which is itself a continuation of application Ser. No. 07/761,692, filed Sep. 18, 1991.

FIELD OF THE INVENTION

This invention relates to a unique apparatus for separating folded web and more particularly to an apparatus that detects proper fold separation locations in order to form stacks of zig-zag folded sheets having special features.

BACKGROUND OF THE INVENTION

It is desirable when outputting processed continuous web, such as perforated computer printout paper, to separate and stack discrete sections of web. It is further desirable to separate the web at locations other than standard fold lines in order to create tabs and indented pages. The Applicant in his copending now U.S. Pat. No. 5,131,640, issued Jul. 21, 1992, which is, in turn, a continuation of application Ser. No. 07/534,724, (filed) Jun. 7, 1990, now U.S. Pat. No. 5,065,992 issued Nov. 19, 1991. U.S. patent application Ser. No. 07/534,724 filed Jun. 7, 1990 , now U.S. Pat. No. 5,065,992 issued Nov. 19, 1991 discloses a method of creating tabbed and indented separations between stacks of zig-zag web. In addition, Applicant's copending U.S. patent application Ser. No. 07/560,127 filed Jul. 31, 1990 now U.S. Pat. No. 5,193,727, issued Mar. 16, 1993, discloses a system for tracking fold and other locations on a continuous web.

Job separators that separate pieces of web into folded stacks have become more popular in recent years. These machines however generally rely upon tractor pin feed holes along the sides of the paper and only separate along pre-perforated fold lines. One such machine is sold currently by the Standard Register Corporation. Machines according to the prior art have limited versatility and application since they include paper/material wasteful tractor pin feed drives requiring side holes upon the web and lack the ability to cut or fold paper at locations other than standard perforations and also, as a consequence, lack the ability to create tabs longer than a normal page length or indents that are shorter than normal page length. Additionally, the prior art has not incorporated the ability to cut fold lengths or fold orientations dynamically, without manual intervention, as the folding process proceeds. Thus, these prior art machines lack needed flexibility for creating a uniquely tabbed and separated stack of output.

SUMMARY OF THE INVENTION

It is an object of the present invention to provide a unique apparatus for separating web that accommodates changes in fold size and fold direction on demand as the process.

It is another object of this invention to provide a unique apparatus for separating web that may be used with a wide variety of web sizes, textures, and thicknesses.

It is another object of this invention to provide a unique apparatus for separating web that automatically detects edges, fold lines, and separation locations and that may be utilized to create tabs and indented pages.

It is another object of this invention to provide a unique apparatus for separating web that scans the web itself to dynamically control separator operation.

It is another object of this invention to provide a unique apparatus for separating web that folds web into a stack of predetermined sizes and fold orientation.

It is another object of this invention to provide a unique apparatus for separating web that incorporates error checking and correction functions.

It is yet another object of this invention to provide a unique apparatus for separating web that allows outputted stacks of folded web to be conveyed in a variety of configurations and includes features that automatically limit, and account for, the maximum possible packaging sizes of stacks.

A web separator according to this invention features a web cutting element that acts at predetermined programmed separation locations along the web. Positioned downstream of the cutting element is a folding element that folds the web at programmed fold locations. These fold locations may be pre-perforated regions on the web which are crushed by rotating beaters, or the folds may be created on the web by the folding element without any pre-perforations or pre-existing creases. Further downstream of the folding element is positioned a set of supporting elements that place the folded web into a zig-zag stack. Positioned ahead of the supporting elements is a continuously swinging director that reciprocates between opposing sides of the supporting element set to guide advancing sections of web onto corresponding opposing fold edges of the zig-zag stack alternately. The web is driven through the cutting element and into the swinging director by a drive member. This drive member may be deactivated by a clutch at selected intervals while other elements of the separator continue operating.

Each of the elements of the separator according to this embodiment may be interconnected to a central drive motor. The swinging director may further include retracting fingers that elevate and extend the directing distance of the advancing web sections when the director is positioned relative to the furthest of the opposing fold edges. The separator may additionally include a bar code detector that reads a bar code place upon the web that represents information relating to separation and fold locations as well as other command information. The separator may also include an upper and lower conveyor disposed below the supporting elements. These upper and lower conveyors may be operated separately in order to generate a variety of web output configurations including a waterfall configuration and a discrete integral stack configuration. The separator may additionally include, located on the swinging director, an auxiliary drive that operates to create a gap between the cut and input sections of web. This gap may be sensed by a cut missed detector that indicates the presence of an incomplete cut.

BRIEF DESCRIPTION OF THE DRAWINGS

The foregoing objects and advantages as well as others will be more apparent with reference to the drawings in which.

DETAILED DESCRIPTION OF THE PREFERRED EMBODIMENT

DETAILED DESCRIPTION OF THE PREFERRED EMBODIMENT

Figure 1:
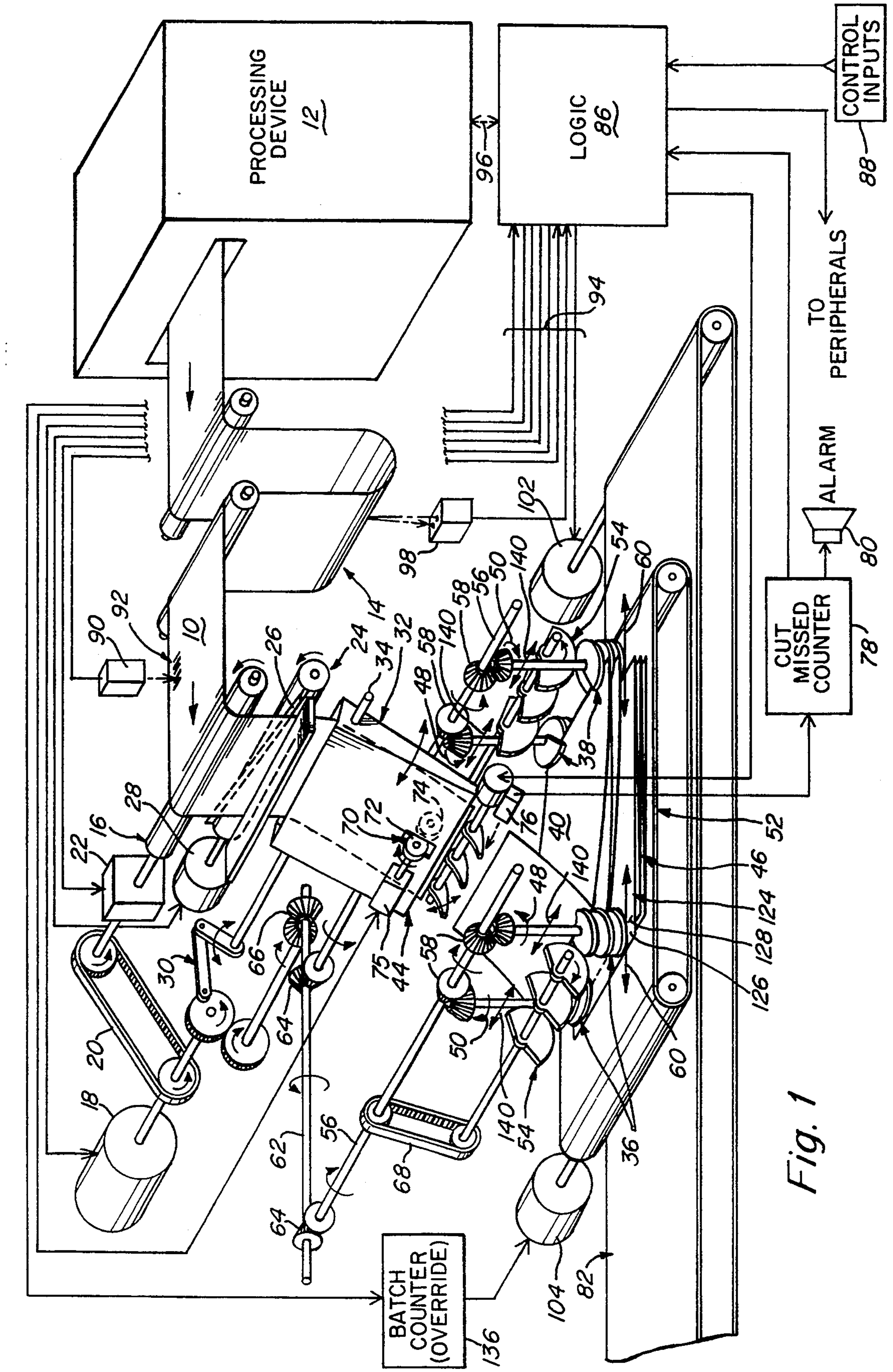
FIG. 1 is a schematic perspective view of an apparatus for separating web according to this invention.

A web separating system according to this invention is depicted in FIG. 1. A web 10 exiting a processing device 12 (such as a printer (laser or other type), punch or other value-added processor) is directed through a loop 14 to the main driving roller 16 of the separating system. The system in this example is powered by a central driving motor 18 that is interconnected with the main driving roller 16 by, for example, a belt 20. The roller 16 is interconnected to the belt drive 20 through a clutch 22 that may be electrically activated to transfer torque from the belt 20 to the roller 16. The roller 16 in this example includes a pinless frictional surface for use with web having no tractor feed pin holes. However, a standard tractor feed pin drive may also be utilized.

From the main driving roller 16, the web is directed into a cutter 24 that, in this example, is a helical-type rotating blade 26 driven by an motor 28. The motor 28 is activated to cut the web 10 at an appropriate time when the system determines that a separation location is in line with the cutter 24. The driving central motor 18 is additionally connected by means of a cam or crank (in this example) system 30 to a director chute 32 which continually reciprocates on a pivot 34 to position the end of the web 10 proximate to either a left or right pair of spiral supports 36, 38 respectively. The director 32, therefore, allows a zig-zag fold pattern 40 to be created between the support pairs 36, 38.

Figure 2:
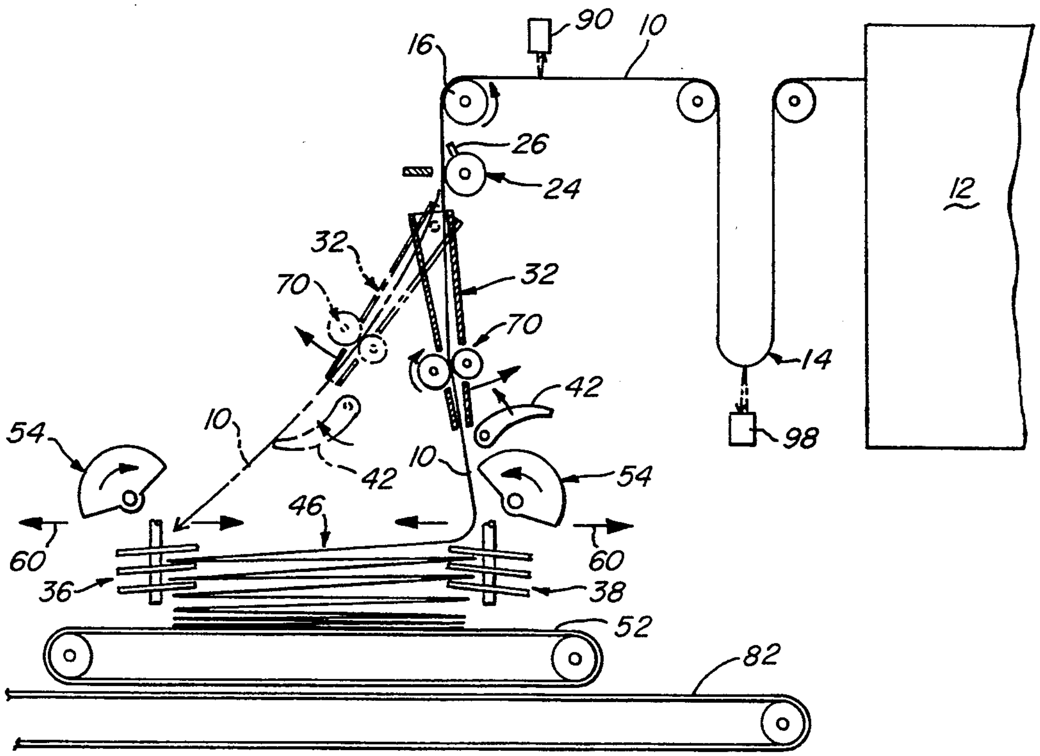
FIG. 2 is a more detailed schematic side view of the mechanical components of the apparatus of FIG. 1 detailing the swinging director, finger, and spiral elements.

A set of retracting directing fingers 42 are mounted at the output end 44 of the directing chute 32 in order to insure that when the web 10 is directed to the left hand supports 36, it is properly guided. The aerodynamics of moving paper or other semi-rigid web material requires some upward direction of the web flow in order to insure that it lands properly on the left support spirals in this position. The closer right hand spiral supports 38 to which the web travels almost vertically downward require no finger extension. The fingers 42, therefore, retract into a non-extended position relative to the web 10 when the directing chute is positioned relative to the right hand supports 38. The operation of the directing chute 32 in forming a stack 46 as well as the particular positioning of the director fingers 42 is detailed in FIG. 2.

The spiral supports 36, 38 themselves are continually rotating (in directions opposite to each other since the spirals have opposing twists shown by arrows 48, 50 in this example) in order to form, to suspend above, and to continuously deliver a multiplicity of folds 40 (in this example three) to the upper conveyor belt 52. These spirals 36, 38 rotate in order to continually lower new folds onto the conveyor surface, thus, forming an even stack 46. Positioned relative to 52 each of the spiral support pairs, left 36 and right 38, are sets of cam shaped beaters 54. These beaters 54 are designed primarily to crush down folds in a pre-perforated, or otherwise creased/prestressed web. For comparison, a beater/spiral system is disclosed in Bunch, Jr., U.S. Pat. No. 4,917,657.

As an alternative, a device that folds the web without pre-perforations or creases may be employed according to this invention.

Each of the pairs of spirals 36, 38 is geared off of its own common shaft 56 having driving bevel gears 58 positioned thereon. Each driving shaft includes a motorized drive for widening and narrowing the distance between the left hand pair 36 and right hand pair 38 of spirals as shown by the arrows 60. Each of the left and right hand sets of spirals 36, 38 can be continually driven while widened and narrowed relative to the other set due to a third driving shaft 62 having slidable bevel gears 64 thereon. This third driving shaft 62 is similarly bevel geared 66 to the central driving motor 18. The bevel gears 66 of the third driving shaft 62 may be positioned to translate upon the shaft by means of a key way that allows axial translation of the gears relative to the shaft while securing, the gears firmly to the shaft in rotation.

In this embodiment the beaters 54 are each interconnected by drive belts 68 to one of the spiral support driving shafts 56 in order to synchronize the operation of folding and the formation and movement of the web stack onto the upper conveyor 52.

Another feature of this system is the pair of auxiliary drive rollers 70 located proximate to the output end 44 of the directing chute 32. In this embodiment, two rollers, a driving 72 and driven idler 74, are disposed through opposing sides of the director chute. A motor 75 is connected to the driving roller. The rollers are in slight compression relative to each other, acting as pinch rollers and firmly grasping the web that passes between them. The rollers 72, 74 may be constructed with a frictional elastomer surface such as polyurethane. These auxiliary drive rollers 70 are generally activated subsequent to the cutting of the web by the cutter 24. The auxiliary drive 70 allows a cut piece of web to be driven away from the remaining input web in order to insure that no binding occurs between the two severed web pieces, and also to allow detection of whether a cut has actually occurred. The detection of a cut is particularly performed by the cut missed detector 76 positioned, in this example, proximate to the directing fingers 42. The cut missed detector 76 scans for a gap between the two severed web pieces after a cut should have occurred. If this gap is not present, as a result of a partial or incomplete cut, the detector 76 signals a cut missed counter logic 78 that sounds an alarm 80 and may also signal the system to shut down.

Figure 3:
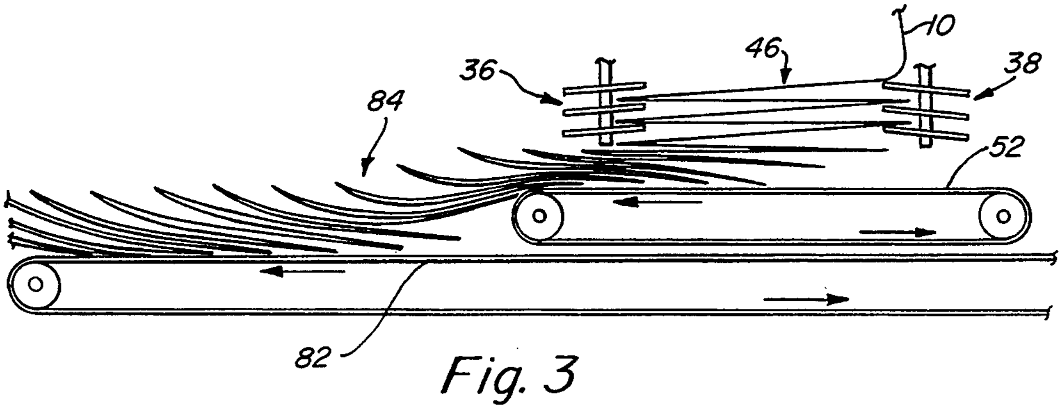
FIG. 3 is a partial schematic side view of a waterfall flow of folded web driven down the conveyor system of FIG. 1.

Positioned below the upper conveyor 52, upon which the newly formed and output zig-zag stack 46 rests, is a lower conveyor belt 82 that generally terminates at a final packaging output point. The upper and lower conveyors 52, 82 may be operated independently of one another. In this way a stack may be continually output as a "waterfall" 84 of offset folds flowing continuously down the conveyors (when both conveyors are moving simultaneously as folded paper is output from spiral supports as shown in FIG. 3), or alternatively, each zig-zag stack may be output as a single integral unit (as when the upper conveyor moves only after the formation of the stack has been completed). A new integral stack may be moved into the lower conveyor stream at any time from the upper conveyor 52 when desired using this system.

Note that the beaters and spirals may be designed to deactivate at given intervals allowing the conveyors to transfer a straight creaseless web of material according to this invention.

Additionally, the speed operation of the upper 52 and lower 82 conveyors relative to one another may be varied by the system in order increase or decrease the "compression " of waterfall or stack folds. The faster the lower moves relative to the upper, the wider the expansion of folds or stacks, while the slower the lower moves, the tighter the compression.

The lower conveyor may terminate at one or more further packaging devices (not shown) such as a boxer, strapper or wrapper. These units may be interconnected with the central processing unit and, thus, receive information on stack size, contents, web size and special package markings from the web bar code or upstream processing device.

The function of the separator system is controlled by a central electronic logic unit 86 that may include a programmable microprocessor and memory. This unit is fed parameters contained in a series of control inputs 88 from an operator. The system, taking into account these inputs, which may include fold size, cut length, tab location, and stack size, determines where to fold and cut, as well as which side of the support spirals 36, 38 (left or right) to begin a new stack upon.

The position of each operation is determined locally in this example by means of a bar code detector 90 that scans the web 10 for printed instructions 92 that may be codified in a standard space and bar format. Using these instructions 92 the logic determines the type of operation to perform and at what location to perform it as well as the overall length of the printed report. In this example, the bar code detector 90 is positioned just prior to the driving roller 16, however, the bar code detector 90 may be positioned anywhere along the web 10 within the system. In so positioning the detector 90, it is important only that the logic 86 be programmed to relate that position to the locations of each of the various system elements it controls. The system could then determine, by counting web distance or determining web speed, when a particular web location reaches a particular element. The printed bar code 92 also provides a reference for the logic 86 as to what web location is currently at the particular position of the detector 90. Using this bar code, as well as the manual control input information, the system activates the various system elements as exemplified by each elements' respective control input arrow 94 from the logic 86. The system may also use the processing device 12 itself to determine various control operations as shown by the dotted arrow 96.

Figure 4:
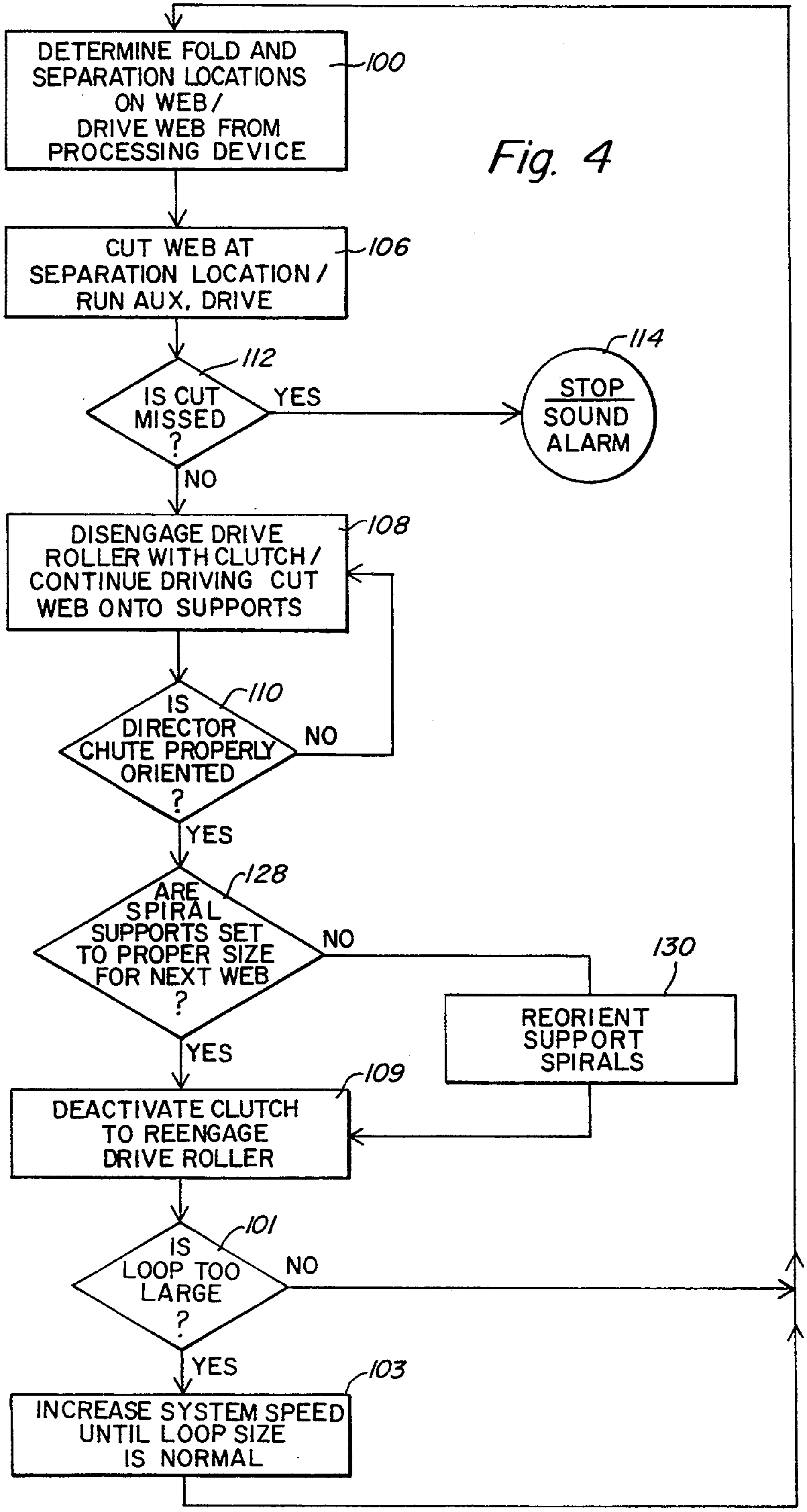
FIG. 4 is a flow diagram of the cutting and folding of a web by the apparatus according to this invention.

The functioning of the system will now be described in detail and is described generally with reference to the flow diagram of FIG. 4 (reference to each step being shown in parenthesis). A web 10 having a predetermined operation bar code is fed from the processing device 12 (100) and forms a loop 14, the length of which is detected by a loop detector 98 (FIG. 1) that communicates with the logic unit 86. The loop detector 98 may be an ultrasonic, infrared or other proximity detection. If the loop appears to be too large (101) relative to a reference value, the central driving motor 18 is instructed by the logic 86 to increase speed (103). Since the entire system is geared to the central driving motor 18, the entire system, therefore, increases in speed simultaneously and in the same degree. The conveying system motors (upper 102 and lower 104) may also be directed by the logic 86 to increase speed.

When the bar code detector 90 transmits instructions to cut the web 10, the logic 86 directs the cutter 24 to slice the web along its length (106). The driving roller clutch 22 may then be activated by the logic 86 in order to allow the director chute 32 to attain a proper position relative to either the left or right pair of supports 36, 38. The particular support pair 36, 38 upon which a new stack is begun is a function of the manual inputs 88 and the bar code information 92. While the clutch 22 is engaged the system drive motor continues to operate, allowing the directors, spirals and beaters, to continue operating as no more web is fed into the system from the processing device (108). This process may be termed "skipping a beat" in that the elements of the system continue to operate while no further web 10 is input into the system from the processing device 12 due to disabling of the driving roller 16.

During the process (110) of attaining proper orientation with respect to either the left or right pair of spiral supports 36, 38 by the directing chute 32 (after cutting the web), the auxiliary driving rollers 70 may be engaged (106) forcing the end of the cut web section away from the input web section and onto the appropriate spiral support pair 36, 38. As the directing chute 32 becomes properly reoriented and the cut web is stacked in the supports 36, 38 the logic 86 instructs the clutch 22 to re-engage (109) the drive roller 16 to again drive the input web. As stated previously, the directing fingers 42 are extended each time the web 10 is guided to be placed upon the left facing a pair of spiral supports 36. Following cut and operation of the auxiliary drive 70, the cut missed detector scans for a completed cut (112). If a complete cut has not occurred the detector sounds an alarm (114) and may instruct the logic to shut down the system and, possibly, the processor 12.

Figure 5:
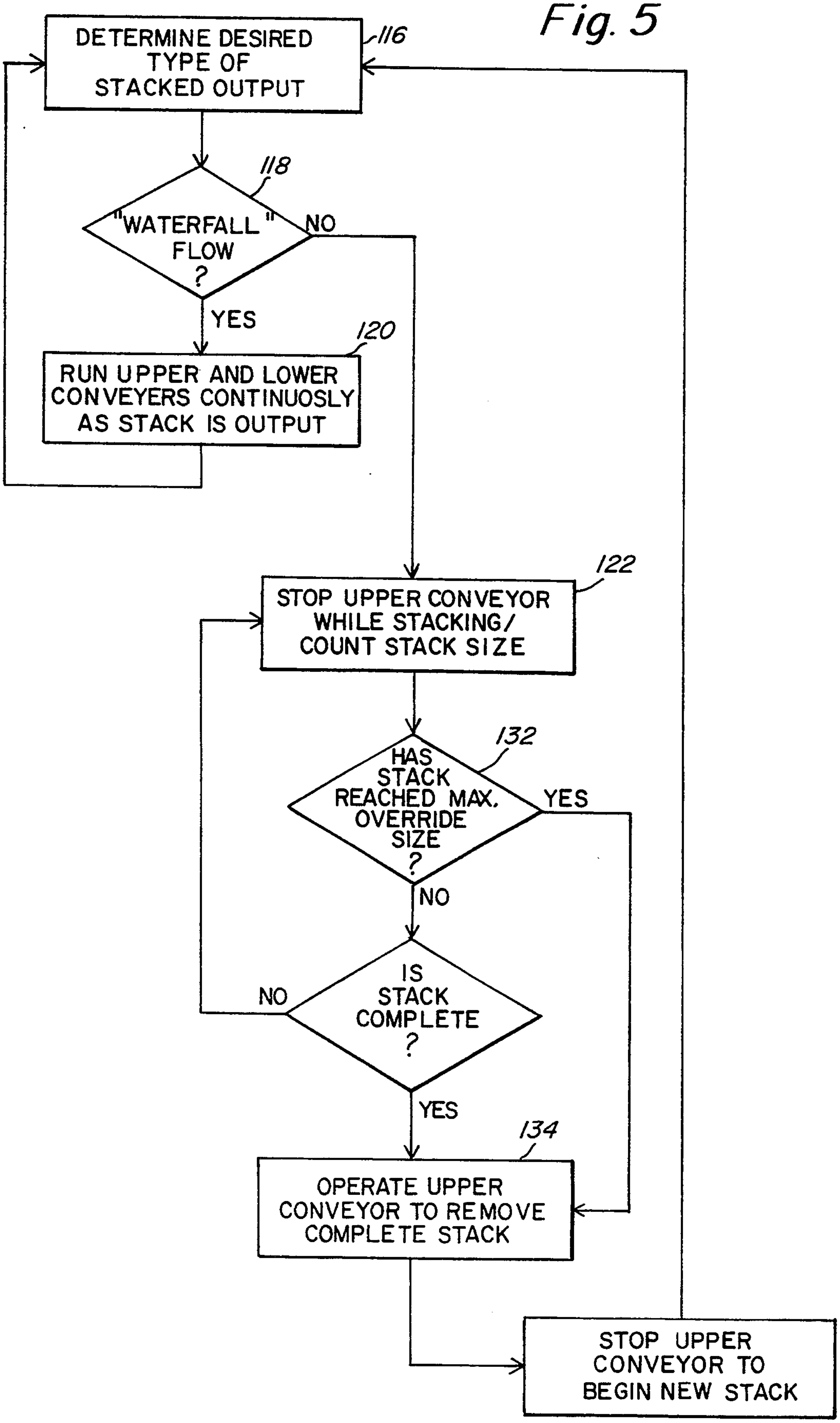
FIG. 5 is a flow diagram of the conveying of outputted folded web by the apparatus according to this invention.

As noted above, while the system "skips a beat" the input loop 14 continues to grow since the processing device 12 is continuing to output web 10. Thus, the loop detector 98 instructs the logic 86 to increase system speed (103), once the clutch 22 re-engages the drive roller (109) so that any excess slack is removed from the loop and the system returns to an equilibrium loop 14 size during processing. The bar code information 92 also instructs the system whether or not a single stack or waterfall flow of paper is to be output (116)(See FIG. 5 flow chart; step references are in parenthesis). This information is fed to the logic 86 and results in commands to the upper and lower conveyors 52, 82 to move either continuously together (120) or intermittently (122) depending upon whether a waterfall or single stack, respectively, is desired (118).

An additional feature of the system is its ability to create tabs and indented pages. The output in FIG. 1 includes a tabbed page 124 having a tabbed piece 126 extended out beyond the normal page width on top of the stack 46. This tab 126 results when a page is cut at other than its fold location 128. The off-fold cut is made possible by the commands in the bar code 92 contained on the web 10 or, as noted previously, by a signal received from the previous processing device. For one method of tracking such separation and page locations see Applicant's copending application as described in the Background of the Invention.

When a particular page is cut with a tab, its length is greater than that of a standard folded page. Thus, to account for this greater page length the left and right pairs of spirals 36, 38 and their corresponding beaters 54 must expand relative to each other. Otherwise, the tabbed page would be too long to be properly supported by the spirals 36, 38 as it is lowered on to the stack. However, a wider expansion between spirals prevents the next group of shorter, normally folded, pages from being properly supported. Thus, the system is instructed to "skip a beat" (128)(FIG. 4) until the elongated tab page has been lowered onto the stack and the spiral pairs can be directed by the logic to, consequently, return to a position of normal spacing between themselves (130). As in the case of reorienting the directing chute 32, loop 14 size increases and the system must subsequently make up for this increased loop size by increasing overall operation speed (to increase web pass-through within the system) relative to the web output speed from the processing device 12. Alternatively, of course, a processing device 12 can be instructed to slow down. However, to attain independent operation and maximum versatility of the separating system it must also be capable of running without direct interactive communication with the processing device 12.

Therefore, since the left and right pairs of spirals 36, 38 expand and contract relative to each other in order to accommodate various lengths of pages, as a general rule, for maximum effectiveness in stacking (See flow chart in FIG. 4), the system should be made to skip beats, presenting further input of web into the system, until a longer or shorter than normal page has traveled through all the spirals and has been laid down upon the stack. In other words, only one size of page length should be carried by the spiral supports 36, 38 at any one time.

The process of skipping a beat is performed in this particular example by means of an electrically operated clutch 22 disposed between the main driving roller 16 and the driving motor power train 18, 20. In this example, the particular clutch employed is a toothed clutch that results in a precisely located engagement and disengagement. The diameter of the driving roller 16 allows the clutch 22 to accurately ratchet in one-half inch increments of web. Thus, an extremely accurate measurement of 8 ½" (normal printout page length) may be achieved by counting 17 increments and actuating the clutch anytime within the time of rotation of the 17th increment. As such, the system logic may be programmed to accurately start and stop the clutch by simply engaging within a given time increment, obtaining perfect page lengths between operations. Since exact timing of the clutch is not required, approximate timing of clutch actuation by the logic 86 still results in nearly perfect web metering accuracy without drift.

Given such a clutch, the system may include elements for counting stack size (by the number of pages), and the logic 86 may be programmed to operate the conveyors when a given stack size is attained (134). The desired stack size may be coded on the web itself. The operation of the conveyors is particularly outline in FIG. 5.

The skipping a beat process also carries the additional advantage of allowing complete reversal of fold direction. This is sometimes desirable in order to reorient the print from face up to face down and vice versa.

As an added feature, the separator system according to this invention includes a batch counter override control circuit 136. This batch counter override 136 may be set to determine the maximum stack size allowable for standard packaging or ease of movement (132). If this size has been attained without a conveyance of the stack, the override may at this point signal the logic to cut the web 10 and complete the stack conveying it off of the upper 52 onto the lower 82 conveyor belt. The override logic may contain some programmed leeway so that if a stack that reaches a maximum package size, but is nearly complete, it may be allowed to be completed without activation of the override command. This leeway is a function of the maximum percentage of allowable error in a given stack packaging size.

The system may additionally accomplish an override of stack separation by means of a processing device notification of pending separation or by means of providing a bar code instructing override.

Finally as depicted in FIG. 1, the system is designed to accommodate different widths of web as well as differing page lengths. Thus, each spiral of the left and right pairs of spiral supports 36, 38 also may be moveable relative to the other spiral in the pair as shown by the transverse arrows 140. This, therefore, allows accommodation of various widths of web. Such width variation may be input into the system by means of control inputs 88 or may be automatically detected by the bar code 92 or by means of interconnection with the processing device 12 itself. The ability of spiral pairs 36, 38 to expand and contract relative to each other is facilitated by slidable bevel gears 58 keyed onto each of the common shafts 56.

It will be understood by those skilled in the art that various changes and modifications to the embodiment shown in the drawings and described above may be made within the scope of the invention. This description, therefore, is to be taken only by way of example and is not to be limited except by the following claims.

What is claimed is:

1. A web separator comprising:

means for cutting a web at predetermined separation locations;

means, positioned downstream of the means for cutting, for folding the web at predetermined fold locations;

means, positioned downstream of the means for folding, for supporting the folded web in a zig-zag stack;

said means for folding including swinging director means to guide advancing sections of web to opposing fold edges of the zig-zag stack;

means for driving the web through the means for cutting into the director means at selected times; and means for determining each of separation and fold locations upon the web, each of the separation and fold locations being positionable independently of one another whereby predetermined sections of web can be folded and cut to sizes different than other sections of web in a zig-zag group.

2. A web separator as set forth in claim 1 wherein the means for supporting includes a pair of rotating spirals disposed along each of the fold edges of the zig-zag stack.

3. A web separator set forth in claim 1 wherein the means for folding includes cam-shape rotating beaters positioned proximate to each pair of rotating spirals that crush the web in to a fold along the fold edges.

4. A web separator as set forth in claim 1 wherein the means for driving includes a pinless drive roller that contacts the web surface.

5. A web separator as set forth in claim 1 wherein the means for determining includes means for detecting a code upon the web representative of each of the separation locations and the fold locations.

6. A web separator as set forth in claim 5 wherein the code is a bar code.

7. A web separator as set forth in claim 1 further comprising conveyor means disposed to transport away the zig-zag stack received from the means for supporting.

8. A web separator as set forth in claim 1 further comprising clutch means to deactivate the means for driving, while at least the means for folding, swinging director means, and means for supporting continue operating.

9. A web separator as set forth in claim 1 wherein the swinging director means includes auxiliary drive means that biases a cut web section away from an input web section.

10. A web separator as set forth in claim 9 wherein the auxiliary drive means biases a cut web section away at a rate faster than that of the means for driving.

11. A web separator as set forth in claim 9 wherein the auxiliary drive means includes a motor driven roller and an opposing idler roller disposed against opposing faces of the cut web section, and each roller exerting pressure on the other to grip the web.

12. A web separator as set forth in claim 11 wherein each of the motor driven roller and the idler roller are disposed proximate to an output end of the swinging director means.

13. A web separator as set forth in claim 11 wherein each of the motor driven roller and idler roller are mounted upon the swinging director means.

14. A web separator as set forth in claim 9 further comprising a cut missed detector means located to sense for presence of an incomplete cut between the cut web section and input web section by sensing the presence of a gap created by the auxiliary drive means.

15. A web separator as set forth in claim 14 wherein the cut missed detector means includes alarm means to indicate an incomplete cut between web sections.

16. A web separator as set forth in claim 14 wherein the cut missed detector means includes means for stopping operation of elements of the separator in response to detection of an incomplete cut between the web sections.

17. A web separator as set forth in claim 1 wherein the means for supporting includes means for engaging web section edges, and the means for engaging includes means for varying spacings of the means for engaging so that the means for supporting can accommodate different sized web sections therein.

18. A web separator as set forth in claim 1 wherein the means for cutting includes blade means for dividing the web at an unbroken and unperforated separation location that can be disposed variably upon the web at any position therealong.

19. A web separator comprising:

means for cutting a web at predetermined separation locations;

means, positioned downstream of the means for cutting, for folding the web at predetermined fold locations;

means, positioned downstream of the means for folding, for supporting the folded web in a zig-zag stack;

said means for folding including swinging director means to guide advancing sections of web to opposing fold edges of the zig-zag stack wherein the swinging director means includes retracting finger means that elevates and extends a directing distance of the advancing web sections when the director is positioned relative to the furthest of the opposing fold edges;

means for driving the web through the means for cutting into the director means at selected times; and means for determining each of separation and fold locations upon the web, each of the separation and fold locations being positionable independently of one another so that predetermined sections of web can be folded and cut to sizes different than other sections of web in a zig-zag group of sections.

20. A web separator comprising:

means for cutting a web at predetermined separation location;

means, positioned downstream of the means for cutting, for folding the web at predetermined fold location;

means, positioned downstream of the means for folding, for supporting the folded web in a zig-zag stack;

said means for folding including swinging director means to guide advancing sections of web to opposing fold edges of the zig-zag stack;

means for driving the web through the means for cutting into the director means at selected times;

means for determining each of separation and fold locations upon the web, each of the separation and fold locations being positionable independently of one another whereby predetermined sections of web can be folded and cut to sizes different than other sections of web in a zig-zag group of sections; and conveyor means disposed to transport away the zig-zag stack received from the means for supporting, the conveyor means including an upper conveyor belt and lower conveyor belt, the lower conveyor belt being disposed proximately below the upper conveyor belt and extending beyond an end of the upper conveyor belt, each of the upper conveyor belt and lower conveyor belt being separately powered and separately operable.

21. A web separator as set forth in claim 20 wherein the conveyor means further includes means for operating each of the upper conveyor belt and the lower conveyor belt in response to a command indicating receipt of a stack of a desired size by the conveyor means.

22. A web separator as set forth in claim 21 wherein the means for operating includes means for generating an override command to cut the web and subsequently operate each of the upper conveyor belt and the lower conveyor belt in response to receipt of a stack of a size that is a maximum allowable size other than the desired size.

23. A web separator as set forth in claim 21 wherein the means for operating includes means for selectively driving the upper conveyor belt and the lower conveyor belt to continuously transport a waterfall stream of zig-zag folded web as each web section is received from the means for supporting.

24. A web separator as set forth in claim 20 further comprising means for determining a mode of operation of each of the upper conveyor belt and the lower conveyor belt, said means for determining a mode of operation including means for detecting a code upon the web representative of the mode of operation and a timing of operation of each of the upper conveyor belt and the lower conveyor belt.

25. In a web separator having a folder and a swinging director chute that transfers web along a path of travel in a downstream direction and that moves through an arc between opposing points, the opposing points being adjacent each of opposing sides of a folder, the director chute being upstream of the folder and delivering web to the folder in a downstream direction and the folder forming a zig-zag fold pattern in the web, the web separator further comprising:

retracting fingers mounted adjacent a downstream end of the director chute, the retracting fingers moving between a retracted position remote from the path of travel of the web out of the director chute into an extended position in which the retracting fingers lie substantially within the path of web travel and support the web along a predetermined distance downstream of the downstream end of the director chute.

26. The director chute as set forth in claim 25 wherein the folder is positioned so that one of the opposing sides thereof is closer to the downstream end of the director chute than another more distant of the opposing sides thereof when the director chute is located at a respective of the points of the arc adjacent a respective side of the folder, and the retracting fingers move into an extended position when the downstream end of the director chute is located at the one of the opposing points of the arc that is more distant from the respective side of the folder and the retracting fingers are retracted when the director chute is located at the other of the opposing points of the arc that is closer the respective side of the folder.

27. The director chute as set forth in claim 25 wherein the retracting fingers comprise a plurality of elongated rigid members each positioned on a pivot and moving between the retracted and the extended position in response to rotation of the pivot.

28. A method for directing web to opposing sides of a folder that folds a zig-zag pattern in the web comprising the steps of:

providing a swinging director chute that directs a continuous web in a downstream direction along a path of web travel to a folder;

rotating the director chute through an arc between each of opposing points;

providing a secondary surface at a downstream end of the director chute, the secondary surface extending into a position along the path of web travel and retracting away from the path of web travel at selected times; and extending the secondary surface to provide additional support to the web when the swinging director chute is positioned proximate at least one of the opposing predetermined points.

29. A method as set forth in claim 28 wherein the opposing sides of the folder comprise a first and a second side and wherein a distance between a downstream end of the director chute and the first side when the director chute is proximate the first side is less than a distance between the downstream end of the director chute and the second side when the director chute is positioned proximate the second side, the step of extending occurring when the director chute is positioned proximate the second side.

30. A method as set forth in claim 29 further comprising retracting the secondary surface and wherein the step of retracting occurs when the director chutes is positioned remote from the second side.

31. A web separator comprising:

a web drive that drives a continuous web in a downstream direction from a source;

a cutter positioned downstream of the drive that separates the web at predetermined locations;

a swinging director chute positioned downstream of and substantially adjacent the cutter, the director chute guiding the web therethrough and swinging through a predetermined arc to each of opposing points thereof; a folder positioned downstream of the swinging director chute, that folds the web from the director chute into a zig-zag pattern, the web having opposing zig-zag fold edges positioned with respect to each of the opposing predetermined points of the arc as the web is folded; and another web drive located on the director chute, constructed and arranged to drive the web out of the director chute and into the folder.

32. A web separator as set forth in claim 31 wherein the other web drive is constructed and arranged to drive the web out of the director chute at a faster speed than the web drive drives the web.

33. A web separator as set forth in claim 32 wherein the other web drive is located proximate a downstream end of the director chute.

34. A web separator as set forth in claim 31 wherein the drive includes a clutch that selectively disengages a drive motor of the web drive so that an overall rate of web drive into the cutter and the director chute is varied.

35. A web separator as set forth in claim 34 further comprising a controller that directs the clutch to disengage the drive motor at predetermined times.

36. A web separator as set forth in claim 35 wherein each of the folder and the other web drive are constructed and arranged to operate when the clutch disengages the web drive motor from the web drive so that a downstream section of web is driven through the director chute and folded as the clutch disengages the drive motor.

37. A web drive as set forth in claim 35 wherein the controller is constructed and arranged to operate the cutter to cut the web at a cut line that is offset from a preformed fold line on the web.

38. A web separator as set forth in claim 1 further comprising a central drive motor interconnected with each of the means for driving, swinging director means, means for folding, and means for supporting.

39. A web separator as set forth in claim 1 wherein the means for determining further determines stack size, tab length and fold direction.

40. A web separator as set forth in claim 1 wherein the means for supporting includes means for varying parameters thereof so that different sized web sections may be supported therein.

* * * * *